United States Patent
Greene et al.

[11] 3,770,042
[45] Nov. 6, 1973

[54] ENDLESS REINFORCEMENT AND METHOD FOR PRODUCING SAME

[75] Inventors: Charles W. Greene; George C. Varner, both of Spartanburg, S.C.

[73] Assignee: Deering Milliken Research Corporation, Spartanburg, S.C.

[22] Filed: Oct. 13, 1972

[21] Appl. No.: 297,508

Related U.S. Application Data

[62] Division of Ser. No. 90,560, Oct. 18, 1970, Pat. No. 3,720,570.

[52] U.S. Cl. .......................... 152/361 R, 152/354
[51] Int. Cl. ............................................. B60c 9/20
[58] Field of Search .................... 161/58, 99, 104, 161/71, 86, 92, 93, 98, 144, 165; 156/175, 181, 177, 326; 152/354, 355, 356, 361

[56] References Cited
UNITED STATES PATENTS

| | | | |
|---|---|---|---|
| 3,589,426 | 6/1971 | Varner | 152/361 |
| 2,982,327 | 5/1961 | Vanso et al. | 152/361 |
| 3,550,667 | 12/1970 | Bartley | 152/361 |
| 3,563,296 | 3/1971 | Wells | 152/361 |
| 3,024,828 | 3/1962 | Smith et al. | 152/361 |
| 3,598,166 | 10/1971 | Wells | 152/361 |
| 3,422,874 | 1/1969 | Weitzel | 152/361 |
| 3,024,829 | 3/1962 | Cooper | 152/361 |

*Primary Examiner*—Drayton E. Hoffman
*Assistant Examiner*—Robert Saifer
*Attorney*—Norman C. Armitage et al.

[57] ABSTRACT

An endless reinforcement which comprises a plurality of unitary strips including a multiplicity of continuous cords with the strips being positioned across the width of the reinforcement from one side to the other at opposing angles to the edges of the reinforcement with successive lengths of the strips being folded with respect to each other at the edges to form a generally zig-zag pattern. Also, a method for producing such a reinforcement and a tire therewith as well as the resulting tire.

1 Claim, 8 Drawing Figures

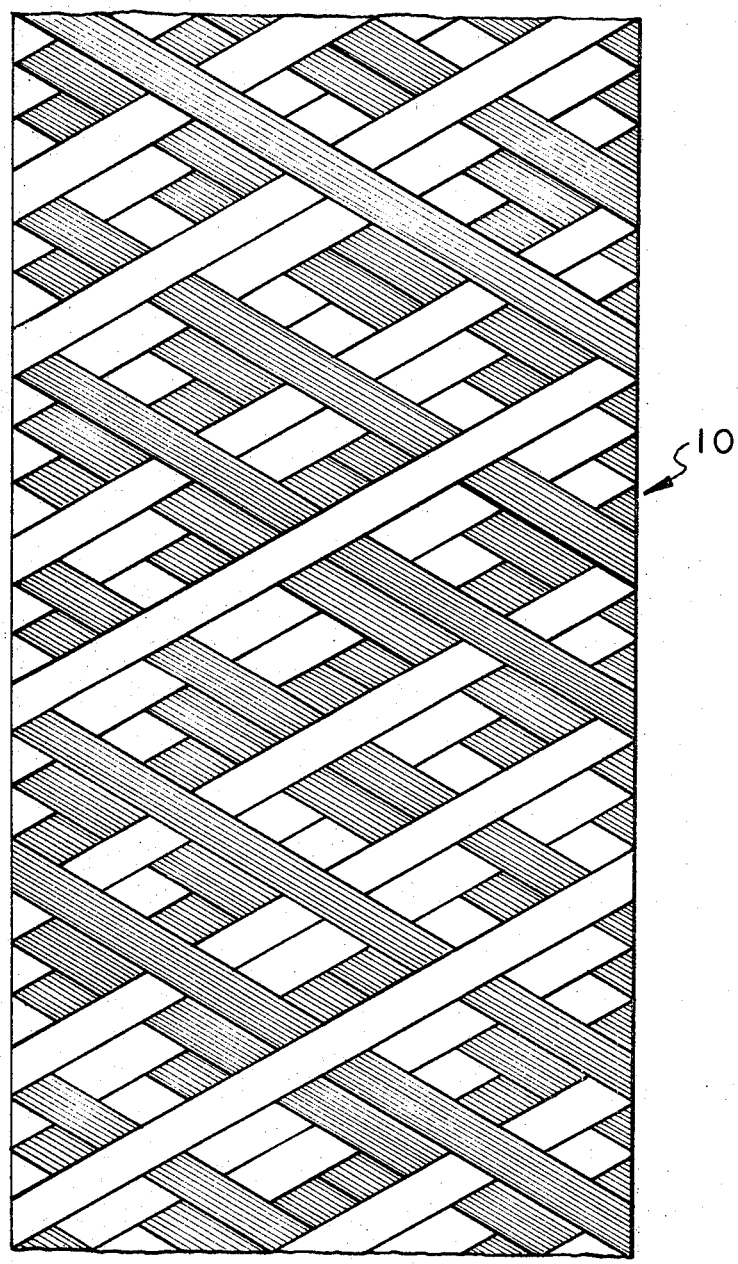
FIG.-1-

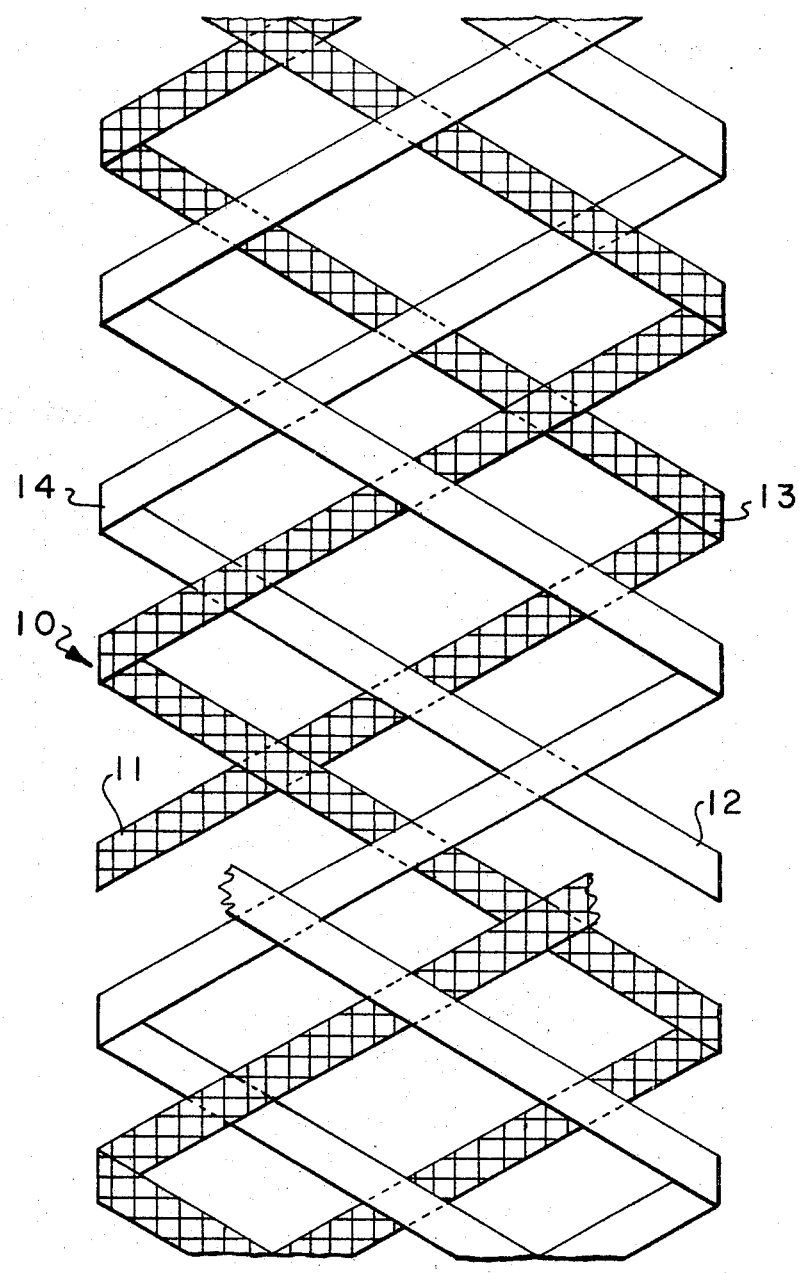
FIG.-2-

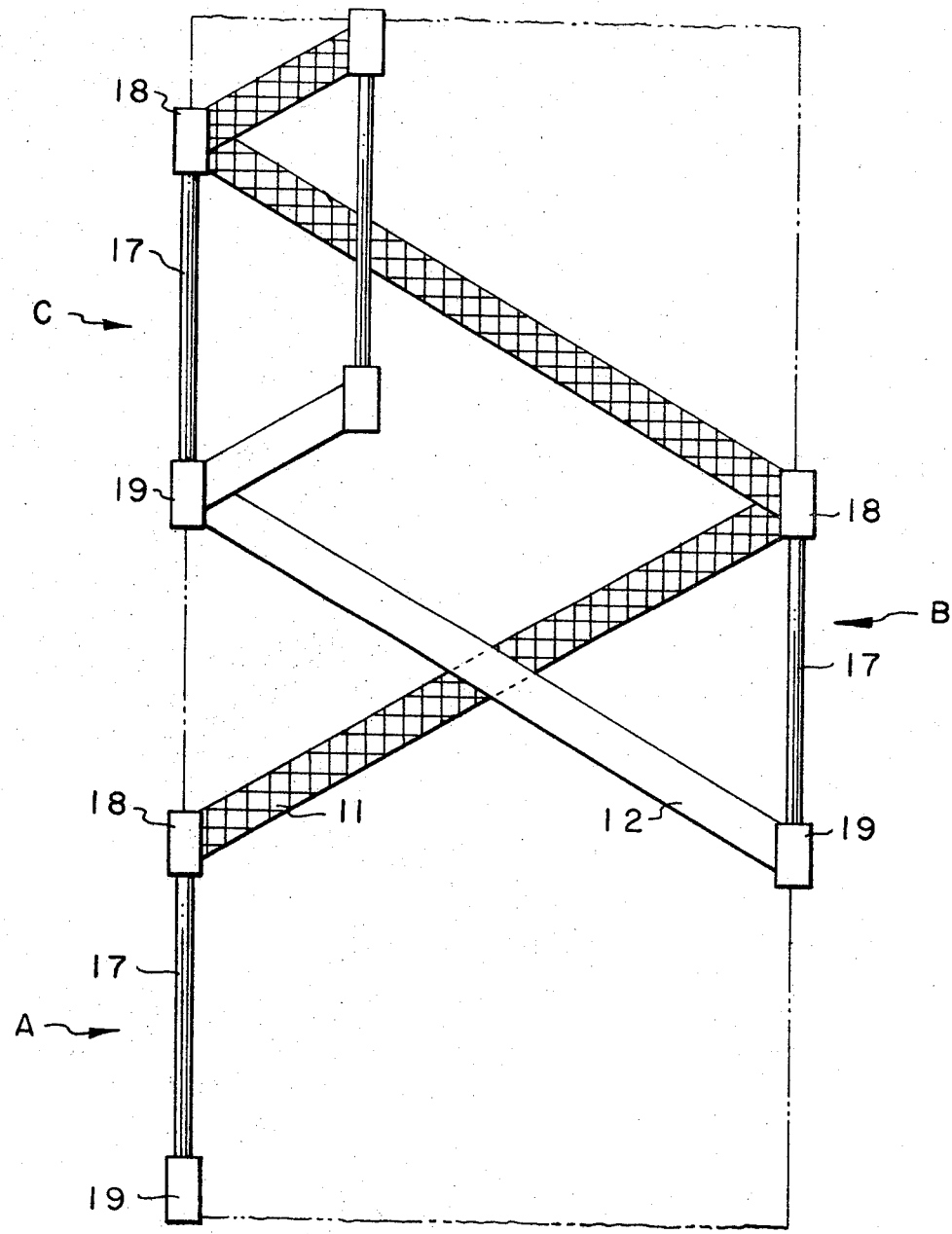
FIG.-3-

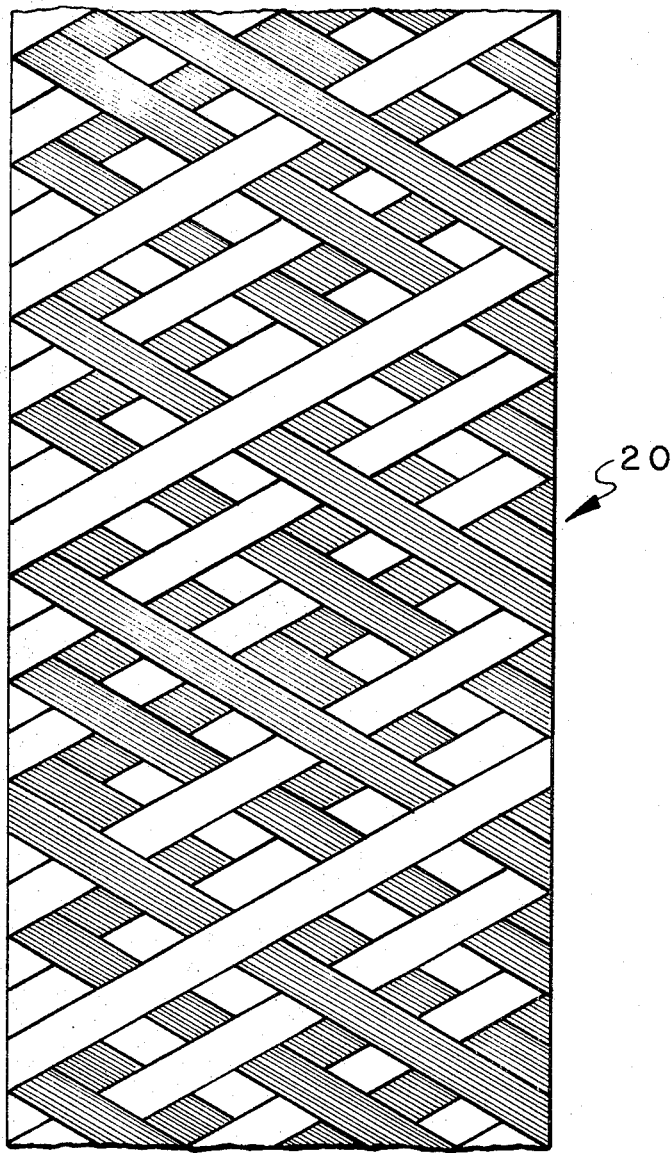
FIG.-4-

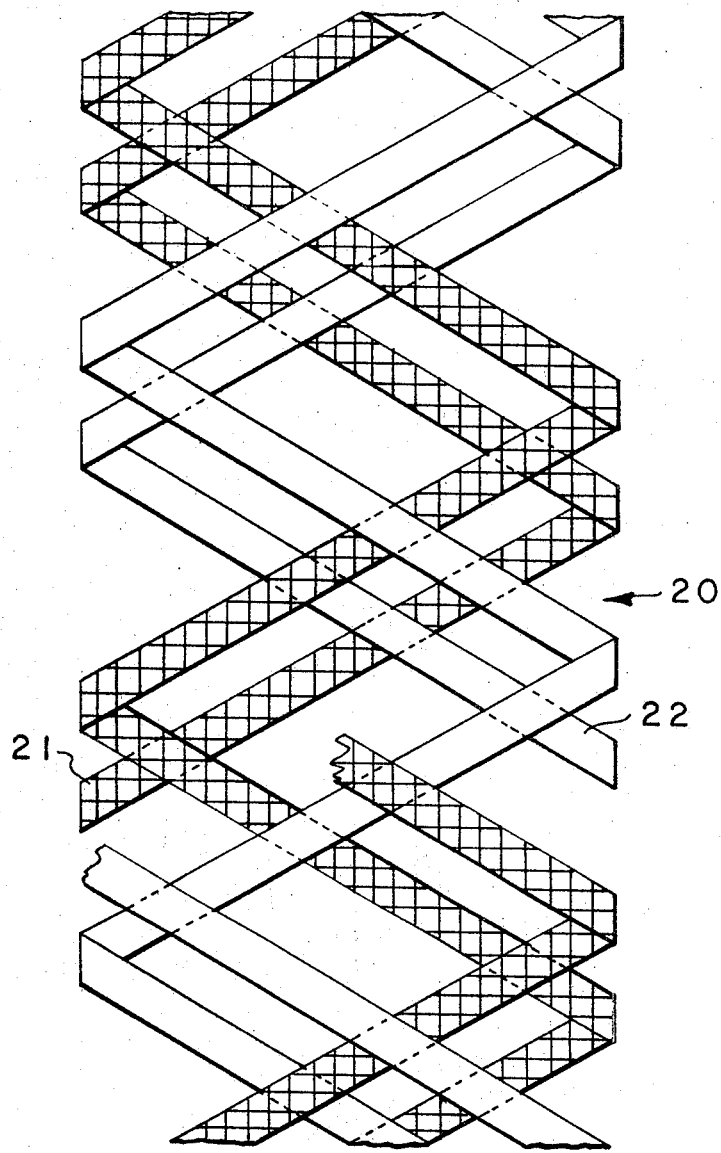
FIG.-5-

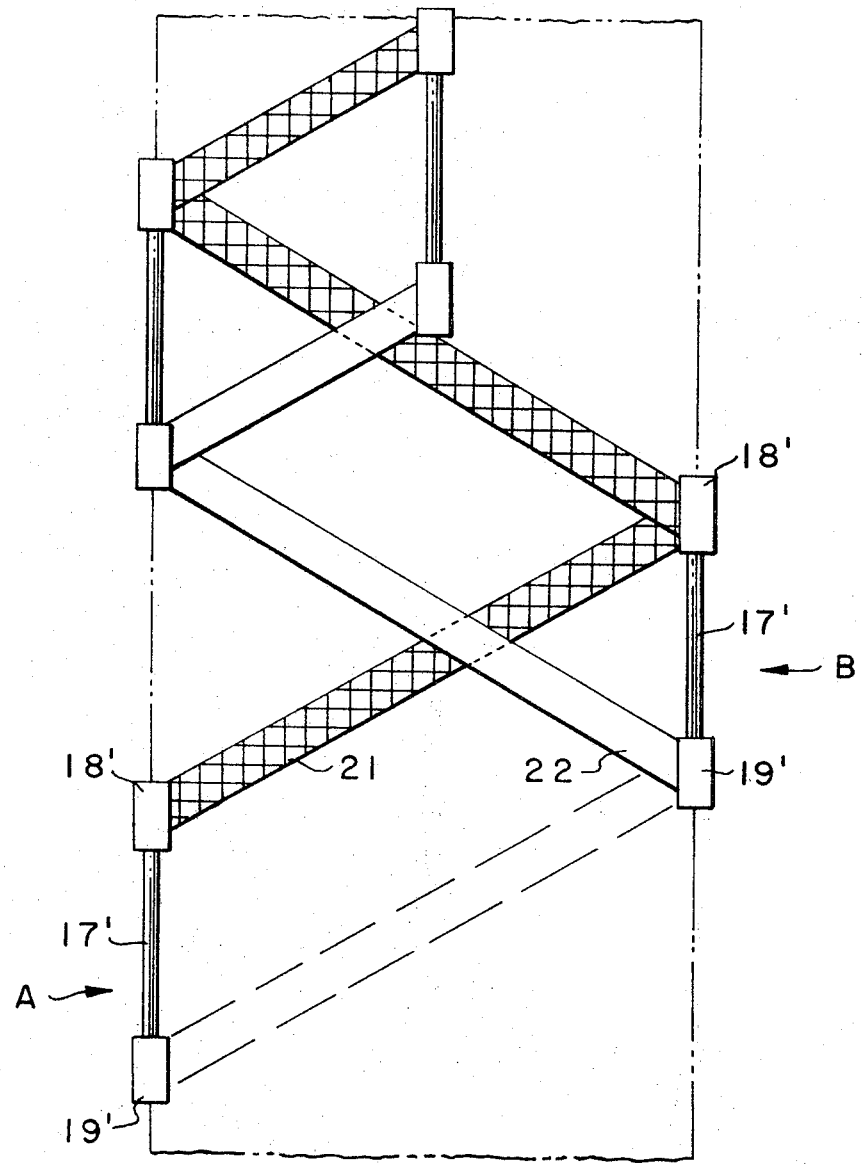
FIG.-6-

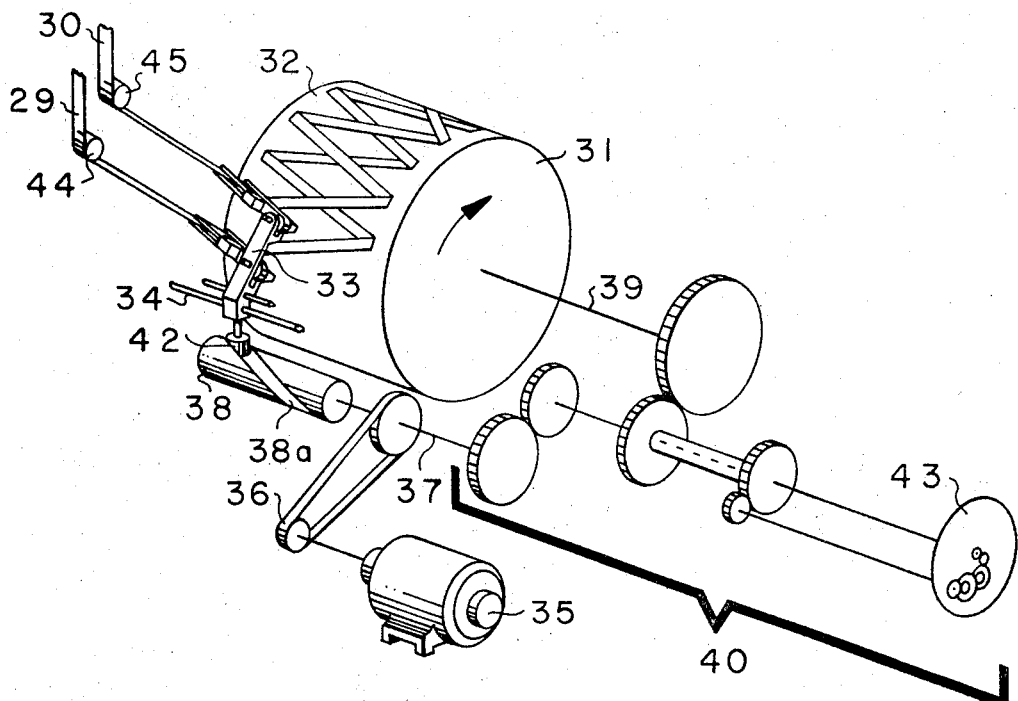
FIG.-8-
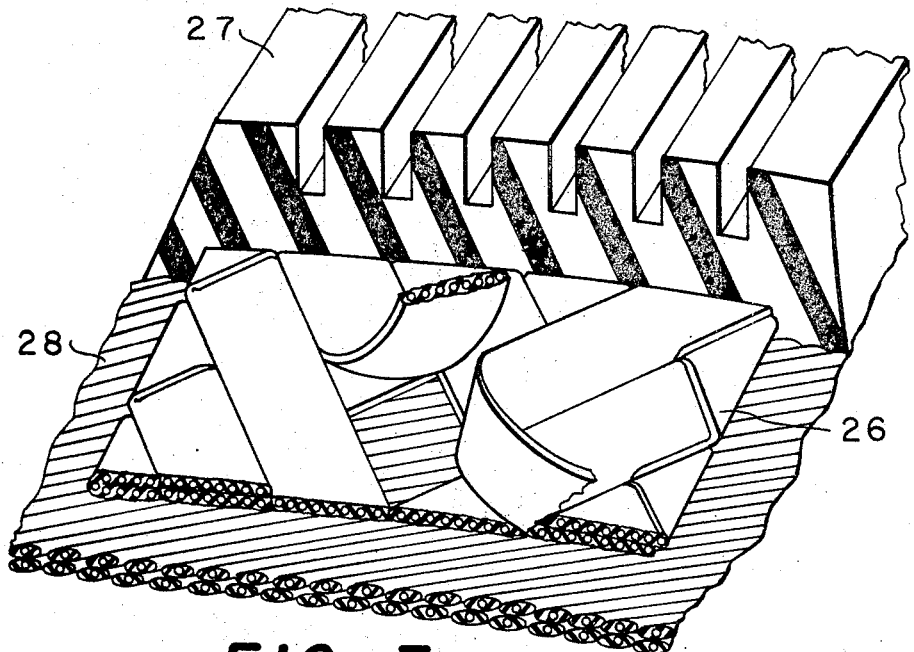
FIG.-7-

ENDLESS REINFORCEMENT AND METHOD FOR PRODUCING SAME

This is a division of application Ser. No. 90,560, filed Nov. 18, 1970, now U.S. Pat. No. 3,720,570.

The tire industry recently has developed considerable interest in tire constructions which include an annular reinforcement belt or breaker about the periphery of the tire between the tread and the carcass. Such belted tires have the advantage of better road stability and longer tread life both in radial and bias ply constructions.

The reinforcements generally are formed of inextensible thread or cord coated with or embedded in a suitable insulating material such as rubber, plastic or some other resinous material. The cords usually are disposed in a pattern in which portions thereof extend in different directions to each other and in direction biased with respect to the longitudinal axis of the reinforcement. This may be accomplished by bias cutting woven fabric which has been calendered with a layer of unvulcanized rubber. Since such reinforcements of necessity are spliced and have a large number of cut ends at each edge, it has been proposed to form reinforcements by winding one or more continuous lengths of cord onto a rotating drum while employing a reciprocating guide to traverse the drum surface and to lay the cord in a generally zigzag pattern thereon. Examples of such reinforcements are disclosed in U. S. Pats. Nos. 2,982,327 and 3,422,874.

One of the considerations in the design of the reinforcment is the effect of the outermost layer on the creation of lateral forces in tires made with such reinforcements. This effect is evident when tires are mounted on a vehicle or on a test wheel under load. With tires including bias cut woven fabric reinforcements the lateral forces are all in one direction while with certain wound continuous cord reinforcements, the lateral forces may be cyclic. It is apparent that such lateral forces are detrimental, and it would be desirable to have a tire in which such forces are eliminated or minimized.

The present invention provides a novel endless reinforcement for tires, drive belts and the like which does not create significant lateral forces in tires. Also, the invention provides a novel method for producing such reinforcements and tires therewith.

The endless reinforcement of the present invention comprises a plurality of unitary strips including a multiplicity of continuous cords with the strips being positioned across the width of the reinforcement from one side to the other at opposing angles to the edges of the reinforcement with successive lengths of the strips being folded with respect to each other at the edges to form a generally zigzag pattern. The summation of the areas in which cords are disposed at one angle is substantially equal to the summation of the areas in which cords are disposed at an opposing angle for a full width portion of the outer surface of the reinforcement constituting between about 5 and 15 percent of the total outer surface area.

The reinforcement of the invention minimizes the lateral forces of the tire in which it is incorporated by substantially equalizing the areas of different cord direction over the "foot print" of the tire. The "foot print" is the area of the tire in contact with the road when the tire is mounted on a vehicle. Generally, the "foot print" comprises between about 5 perc and 15 percent of the total surface area of the tire periphery.

The endless reinforcement of the invention preferably is formed by positioning two unitary strips in substantial mirror image disposition with respect to a plane circumferentially bisecting the reinforcement. Thus, transversely disposed points on corresponding strip lengths are located substantially equidistant from the edges of the reinforcement and from the bisecting plane. With certain strip patterns, hereinafter illustrated, the strips may be disposed in a more forward or rearward position circumferentially to provide for equal spacing of the strips in the finished reinforcement.

The endless reinforcement usually is of a generally cylindrical form or configuration and is made from conventional tire cord materials such as fiber glass, rayon, polyester, nylon, cotton, metal wire and similar type cords, although the benefits and advantages of the invention are particularly apparent with materials such as fiber glass, metal wire, etc., which are easily abraded or degraded by cord to cord contact. The dimensions of the reinforcement may be varied over a considerable range depending upon the ultimate use thereof. For example, with reinforcements which are to be applied to tire carcasses in flat band form, the circumference will be considerably smaller than the final circumference in the finished tire. Likewise, the original width will be substantially larger than the final width. This is due to the fact that during the expansion step in the forming of the tire, the circumference of the reinforcement generally will be substantially increased and the width will be significantly reduced. During this expansion, the angle of the cord across the width of the reinforcement from one side to the other as measured from the edge will be reduced substantially. With reinforcements which are applied to a carcass that has already been formed into the shape of a torus, i.e., a doughnut shape similar to that of the final tire, the dimensions will be more nearly the same in the original form as applied to the carcass and in the final size in the finished tire.

As pointed out above, the endless reinforcement of the invention is formed from a plurality of unitary strips including a multiplicity of continuous cords associated with rubber, plastic or a similar material. Although the configuration of the individual strip generally is rectangular with the cords in a single plane and equally spaced from each other, the cords may be unequally spaced and/or disposed in more than one plane. Also, the cords may be of different sizes or different materials, e.g., the end cords may be rayon with the intermediate cords being metal wires or other combinations of different cords. Likewise, heavier rubber coatings may be used at certain portions across the width of the strip or along the length thereof as desired. While the strip generally will have a smooth outer rubber surface, indentations or openings through the strip may be utilized.

The strip employed in the reinforcement of the invention advantageously is formed by passing a plurality of cords in the desired spaced relationship through an extruder, although other methods may be employed. For example, a number of parallel cords or a cord fabric may be calendered with rubber and then slit into strips of the desired width. In addition, the strip may be formed by coating a plurality of cords with a rubber latex in a multiple dip operation to form a unitary strip.

Prior to the formation of the reinforcement, the rubber of the strip may be partially or totally vulcanized.

The width of the strip may vary over a considerable range and generally is between about ½ and 2 ½ inches and preferably between about ¾ and 1 ½ inches to facilitate convenient handling and reinforcement construction. The particular width selected will depend upon belt size and the reinforcement pattern desired. For example, with some applications such as large off-the-road machinery, the strip width may be up to six inches or more.

The employment of the strip in the production of the reinforcement of the invention permits closer cord spacing than is ordinarily attainable when reinforcements are made from single cords. Thus, cord spacing of about 18 to 30 or 40 cords per inch of strip width may be employed, depending upon cord size, without cord to cord contact occurring in the reinforcement. However, wider cord spacing of 10 cords per inch or less may be advantageous under some conditions.

The reinforcement preferably is formed from a minimum number of strips so that the number of cut ends in the reinforcement is minimized. If the complete reinforcement is formed from two continuous strips, the ends of the strips are the only cut ends in the reinforcement. With certain reinforcement designs, it may be desirable to form the reinforcement from more than two strips with each strip being of the same or different width and length. This facilitates the production of a reinforcement in a shorter period of time and/or produces a reinforcement with a different pattern. Such patterns may be desired to produce belts having particular characteristics such as a higher degree of symmetry and the like. In either construction, the reinforcement of the invention is endless, thus eliminating overlapping or splices which can lead to imbalance and possible premature failure of a tire.

As pointed out above, the strips are positioned across the width of the reinforcement from one side to the other at opposing angles to the edges in the generally zigzag pattern. With reinforcements intended to be expanded, the initial angle of the strips and the cord therein is generally in the range of about 50° to 80° and preferably about 50° to 60° as measured from an edge of the reinforcement. During expansion, the angle of the strips and cord usually will be reduced to an angle in the range of about 5° to 35°. With a reinforcement which is applied to a carcass after the carcass has been expanded the angle is generally in the range of about 5° to 35°. It may be desirable with certain constructions to provide a change in the angle of the strips and/or cord across the width of the reinforcement. Thus, the angle in portions of the strips adjacent to the edges of the reinforcement may be greater or less than the angle in the center portion. Such a construction may be advantageous where different reinforcement expansion characteristics are desired for particular shapes or types of tires.

In the reinforcement of the invention, the strips are folded at the edges of the reinforcement. Upon folding of the strips, the succeeding lengths of the strips are positioned in the zigzag pattern at approximately the same angles with respect to one edge as the previous length of each strip prior to the fold is with respect to the opposite edge. This provides a symmetrical cord position in the final reinforcement and minimizes the possibility of imbalance in the tire. If desired, the strips can be preconditioned, e.g., prefolded, prior to the formation of the endless reinforcement.

The strips may be associated with a green or unvulcanized rubber layer to form the reinforcement. This may be accomplished by forming the strips in their generally zigzag pattern over the surface of such a rubber layer or band. Also, a rubber layer may be placed over the outer surface instead of or together with a second rubber layer on the inside thereof. It may be desirable in some constructions to provide rubber shoulder portions adjacent the edges of the reinforcement. Such shoulder portions can be used alone or in combination with one or more rubber layers. The shoulder portions assist in the elimination of entrapped air and in the positioning of the reinforcement with respect to the carcass so that the edges will be properly disposed in the final tire in relation to the center portion of the reinforcement. Such shoulder portions are particularly useful in the production of tires in which it is desirable that the reinforcement be disposed equidistant from the tread surface at all points across the width thereof.

The reinforcement of the invention made with two or more strips each containing a multiplicity of cords provides a novel structure with a reduced number of crossovers, that is, points at which a cord transfers from one surface of the reinforcement to another, adjoining a cord transferred in the opposite direction. This reduction in cross-overs is particularly important in reinforcements employing cord elements which may be damaged by cord to cord contact. A further advantage of the structure of the invention is that the transfer of the strips from one surface of the reinforcement to the other does not result in any significant thickening of the belt cross section as may occur with single cord reinforcements. Also, the use of unitary strips decreases the production time for a reinforcement as compared with single cord constructions. In addition, the cord spacing may be significantly decreased without increasing production time.

The invention will be further illustrated with reference to the accompanying drawings, in which:

FIG. 1 is a schematic illustration of one embodiment of an endless reinforcement of the invention showing a portion of the strip pattern of the outer surface and the cord direction within the strips;

FIG. 2 is a schematic illustration of a portion of the pattern of the partially formed reinforcement of FIG. 1;

FIG. 3 is a schematic illustration showing the sequence of strip positioning at the beginning of the winding cycle of the reinforcement of FIG. 1;

FIG. 4 is a schematic illustration of another embodiment of an endless reinforcement of the invention showing a portion of the strip pattern of the outer surface and the cord direction within the strips;

FIG. 5 is a schematic illustration of a portion of the pattern of the partially formed reinforcement of FIG. 4;

FIG. 6 is a schematic illustration showing the sequence of strip positioning at the beginning of the winding cycle of the reinforcement of FIG. 4;

FIG. 7 is a fragmentary schematic view of a tire including an endless reinforcement of the invention; and FIG. 8 is a schematic illustration of one form of apparatus for forming an endless reinforcement of the invention.

Portions of typical endless reinforcements in accordance with the invention are shown in FIGS. 1-7 of the drawings. The reinforcement 10 illustrated in FIGS. 1-3 is similar to the reinforcement 20 shown in FIGS. 4-6 except that the strip pattern is different. As shown in FIG. 2, strips 11 and 12 are disposed in a zigzag repeating pattern with succeeding lengths of the strips being displaced from the preceding ones. The reversal points or folds 13 and 14 form the edges of the reinforcement. The starting positions of the strips 11 and 12 are located at points along the edges of the reinforcement which are disposed transversely across the width of the reinforcement. Likewise, succeeding folds of each strip are disposed transversely with respect to each other. In FIG. 3 a simple guide means 17 has strip guide heads 18 and 19 which are movable with respect to the surface on which the reinforcement is wound. Longitudinal movement of the surface while the guide means is moved transversely positions the strips at an angle with respect to the surface.

To provide a lay down as shown in FIG. 2, initially only strip 11 is deposited as guide means 17 moves from position A to position B. Thereafter, guide means 17 moves from position B to position C, and the feeding of strip 12 through guide head 19 is begun while feeding of strip 11 is continued. Succeeding lengths of strips 11 and 12 are fed through the guide heads 18 and 19 respectively until guide head 18 returns to its starting position where the feeding of strip 11 through guide head 18 is stopped and the feeding of strip 12 through guide head 18 is continued for one last traverse across the reinforcement to the starting point of strip 12. This completes the reinforcement. FIG. 1 shows the strip pattern of the outer surface and the direction of the cords within the strips. The lined strip portions represent cords in one direction and the blank portions represent cords in the other direction.

The endless reinforcement 20 shown in FIGS. 4, 5 and 6 is formed in the same manner as that described above. However, the pattern of the reinforcement shown in FIG. 4 is different from that shown in FIG. 1 in that the reinforcement of FIG. 4 has fewer diamond-shaped areas across the width of the reinforcement, one less than the pattern of FIG. 1. With this construction, the starting positions of the strips are different from those shown in FIG. 2. As shown in FIGS. 5 and 6 of the drawings, the starting point of strip 22 is displaced circumferentially from the starting point of the strip 21, a distance equal to the length of the fold. The reinforcement of FIG. 4 is formed in the manner described above employing a similar guide means 17' having guide heads 18' and 19'. The reinforcement is formed using guide means 17' by feeding only strip 21 through guide head 18' on the first transverse from position A to position B and then feeding both strips 21 and 22 through guide heads 18' and 19' respectively until guide means 18' returns to the starting position of strip 21 after which the last length of strip 22 is positioned to complete the reinforcement. Alternatively, strips 21 and 22 can be started at the same edge of the reinforcement as shown by the dotted line of strip 22 from position A to position B of guide means 17'. The strip pattern of the outer surface of the complete reinforcement is shown in FIG. 4.

FIG. 7 shows a section through a tire including a reinforcement of the invention with a reinforcement 26 being disposed within the carcass between the tread 27 and the carcass plies 28.

As shown in FIG. 8, one form of apparatus for forming the reinforcement of the invention includes a rotatable winding drum 31 having a generally cylindrical outer surface 32 providing a supporting surface for cord strips 29 and 30 to be positioned thereon. Associated with the drum 31 is guide means 33 mounted for movement on rod 34 for laying strips 29 and 30 is desired zigzag patterns on drum surface 32. Drum 31 and guide means 33 are driven by a power source shown as motor 35. Motor 35 is drivingly connected through a belt and pulley arrangement 36 to a rotatable shaft 37. Shaft 37 is connected to a barrel cam 38 and to drive shaft 39 for drum 31 through a suitable gear train 40. A cam follower 42 connected to the strip guide 33 engages a groove 38a in the surface of cam 38. Groove 38a is of such a configuration that during rotation of the winding drum 31, guide 33 reciprocates across drum surface 32 transversely to the direction of rotation so that strips 29 and 30 are laid in a zigzag pattern over surface 32, the strips being folded back on themselves at the edges of the reinforcement.

Gear train 40 includes a gear mechanism 43 to control the positioning of the strips on drum surface 32 during the subsequent rotation of the drum 31 so the strips being laid on the surface are in a predetermined position with respect to other strip lengths. This control of the strip lay down provides for the achievement of the desired pattern in the reinforcement and provides for the formation of a complete reinforcement, i.e., a belt in which the strip spacing and configuration is substantially uniform and in accordance with the preselected pattern.

In a preferred procedure for forming a reinforcement of the invention employing the apparatus shown in FIG. 6, winding drum 31 is continuously rotated to draw unitary strips 29 and 30 including a multiplicity of tire cords (not shown) over guides 44 and 45, through guide 33 and onto drum surface 32. Simultaneously, the guide 33 reciprocates with respect to the surface of the drum 31 to lay the strips in a zagzag pattern on the surface thereof. As guide 33 approaches an edge of the drum surface, the movement of the guide is reversed by the cam 38 so as to fold the strips back on themselves and provide a reversal of the strip pattern across the surface 32 in an opposite direction. The relationship of the speed of rotation of the drum 31 with respect to the movement of guide means 33 determines the strip pattern of the reinforcement. The winding of the strips on the surface is continued until the pattern is completed. In this way an endless reinforcement is formed from two continuous strips.

The invention will be described in greater detail with reference to the following examples which are intended to illustrate the invention without restricting the scope thereof.

EXAMPLE I

A reinforcement for a pneumatic tire is made on an apparatus as shown in FIG. 8 employing the following procedure. The circumference of the reinforcement is 50 inches and the width is 9.2 inches. The angle of the strip is 60°. A belt as shown in FIG. 1 of the drawings is formed by winding two rubber coated cord strips each 0.66 inches wide and 0.06 inches thick containing 12 brass plated steel cords about 0.024 inches in diameter, seven revolutions of the drum with 4 5/7 cycles of the cord guide per drum revolution, one cycle being a traverse across the drum and back.

The endless reinforcement is applied to a flat band tire carcass and tread and sidewall-forming rubber stock is placed over the breaker. The flat band assembly is shaped in the form of a torus under heat and pressure and vulcanized to form a tire. During the shaping process the circumference of the reinforcement is increased to about 90 inches and the width thereof reduced to about 4.6 inches. The cord angle is about 26° as measured from an edge.

EXAMPLE II

The procedure of this example is the same as that of Example I except that the width of the reinforcement is 9.0 inches. A belt similar to that shown in FIG. 4 is formed from two rubber covered cord strips each 0.75 inches wide and 0.06 inches thick containing 14 brass plated steel cords about 0.024 inches in diameter, after 6 drum revolutions with 4 5/6 cycles of the cord guide per revolution.

EXAMPLE III

The procedure of this example is the same as that of Example I except that the reinforcement has a circumference of 120 inches, a width of 7.2 inches and a strip angle of 24°. A reinforcement is formed after 7 revolutions of the drum with 3 5/7 cycles of the guide per drum revolution, from strips each 0.94 inches wide and 0.06 inches thick containing 18 brass plated steel cords 0.024 inches in diameter. This reinforcement is used in a tire retreading operation by applying the reinforcement over a tire from which the tread has been buffed. Thereafter, tread stock is applied over the belt, and the assembly is vulcanized to form a retread truck tire.

The above description, drawings and examples show that the present invention provides a novel reinforcement for a pneumatic tire which overcomes the disadvantages of bias-cut fabric reinforcements and the problems of endless cord reinforcements heretofore known. The construction of the reinforcement of the invention substantially eliminates cord to cord contact during manufacture and use which can result in premature tire failure. The reinforcement of the invention provides a high degree of flexibility in the configuration and dimensions which can be employed. Furthermore, the reinforcement of the invention is useful both for new tires and for retread tires. For new tires the reinforcement of the invention not is only useful in radial type tires where the reinforcement is applied after the carcass is shaped into the form of a torus, but also the belt is particularly suitable for use in tires made by flat band building methods in which the reinforcement is applied to the carcass in flat band form and expanded during the carcass shaping procedure. A further advantage of the reinforcement of the invention is the high degree of balance and absence of lateral forces which can be achieved in tires incorporating the reinforcement. This is due to the disposition of the strips with respect to one another and the fact that the reinforcement is without a splice. Also the reinforcement does not contain separate plies which can create shear planes and transverse forces or side-thrust in a running tire.

While the above description has been directed primarily to an endless reinforcement for various types of tires it will be apparent that the present invention may be utilized to provide reinforcements for other endless reinforced products such as drive belts, conveyor belts, snow-mobile belts and similar products. Also, the reinforcement of the invention is useful for the production of other cord components of a tire, for example, for the carcass itself or for a unitized breaker/carcass assembly. The reinforcement can be wound over a carcass or applied thereto in flat band form and expanded, e.g., to produce a belted bias ply tire, or wound over or applied to an expanded carcass such as in the production of a radial ply tire. Furthermore, the reinforcement can be used with a tire from which the tread has been removed, new tread stock applied and vulcanized to form a retread tire.

It will be apparent to one skilled in the art that various modifications and variations in the procedures, materials and apparaus can be made within the scope of the invention. For example, while a single reinforcement will generally replace a conventional two-ply breaker belt, more than one reinforcement or a reinforcement of extra thickness may be advantageous in certain applications. Therefore, the foregoing description, drawings and examples are intended to illustrate the preferred embodiments of the invention, and scope of the invention is to be limited only by the following claims.

That which is claimed is:

1. A tire having a carcass and a tread, said tire including an endless reinforcement which comprises a plurality of unitary strips including a multiplicity of continuous cords with the strips being positioned across the width of the reinforcement from one side to the other at opposing angles to the edges of the reinforcement and with successive lengths of the strips being folded at the edges to form a reinforcement with a generally zig-zag pattern and a substantially uniform cross-section wherein the strips are positioned in substantially mirror image relationship to a circumferentially bisecting plane through said reinforcement in a plurality of wraps with successive wraps being spaced from each other and with the cords of said strips being in contiguous relationship throughout the entire length of said strips, and the summation of the areas in which cords are disposed at one angle being substantially equal to the summation of the areas in which cords are disposed at an opposing angle for a full width portion of the outer surface of the reinforcement constituting between about 5 and 15 percent of the total outer surface area.

* * * * *